US008407030B2

(12) United States Patent
Masse et al.

(10) Patent No.: US 8,407,030 B2

(45) Date of Patent: Mar. 26, 2013

(54) METHOD FOR DETERMINING A TIME COURSE OF AN ACCIDENT OCCURRING IN A RISK-PRONE INSTALLATION

(75) Inventors: Véronique Masse, Voisins le Bretonneux (FR); Maurice Chiron, Quincy-Voisins (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 347 days.

(21) Appl. No.: 12/739,142

(22) PCT Filed: Oct. 22, 2008

(86) PCT No.: PCT/EP2008/064276

§ 371 (c)(1), (2), (4) Date: Jun. 21, 2010

(87) PCT Pub. No.: WO2009/053385

PCT Pub. Date: Apr. 30, 2009

(65) Prior Publication Data

US 2010/0324871 A1 Dec. 23, 2010

(30) Foreign Application Priority Data

Oct. 22, 2007 (FR) ..................................... 07 58468

(51) Int. Cl.
*G06F 7/60* (2006.01)
*G06G 7/48* (2006.01)

(52) U.S. Cl. ............................................... 703/2; 703/6

(58) Field of Classification Search .................. 703/2, 6
See application file for complete search history.

(56) References Cited

U.S. PATENT DOCUMENTS

| | | | | |
|---|---|---|---|---|
| 5,780,856 | A * | 7/1998 | Oka et al. | 250/367 |
| 2008/0272305 | A1 * | 11/2008 | Shirakawa et al. | 250/371 |
| 2009/0114830 | A1 * | 5/2009 | Rubenstein | 250/370.08 |
| 2009/0223129 | A1 * | 9/2009 | De Radigues et al. | 48/194 |

FOREIGN PATENT DOCUMENTS

WO WO 2005/017659 A2 2/2005

OTHER PUBLICATIONS

International Preliminary Examination Report for PCT/EP2008/064276 dated Aug. 5, 2010.
International Search Report for PCT/EP2008/064276 dated Dec. 16, 2008.
French Preliminary Search Report for FR 0758468 dated Jun. 20, 2008.

(Continued)

*Primary Examiner* — Omar Fernandez Rivas
*Assistant Examiner* — Nithya Janakiraman
(74) *Attorney, Agent, or Firm* — Nixon Peabody LLP

(57) ABSTRACT

A method for determining a time course of an accident which occurs inside an installation in which takes place at least one risk-prone process, characterized in that it comprises: (a) a step ($M_S$) for determining a source term (S(t)) which identifies a source at the origin of the accident and which comprises rate data of a harmful substance emitted by the identified source, (b) a step ($M_{cd}$) for calculating in real time, amounts of the harmful substance present in different points of the installation, from said rate and from geometrical data (GI1) of the installation, and (c) a diagnostic step ($M_D$) at the end of which a datum (dInt) of feasibility or non-feasibility of intervention in the installation is delivered, after analysis of the time-dependent variations of the amounts calculated in the calculation step.

13 Claims, 10 Drawing Sheets

OTHER PUBLICATIONS

Ruizhong Lin et al., "Wireless Sensor Networks Solutions for Real Time Monitoring of Nuclear Power Plant," Proceedings of the 5th World Congress on Intelligent Control and Automation, Jun. 15-19, 2004, Hangzhou , P.R. China.

Julie Pullen et al., "A Comparison of Contaminant Plume Statistics from a Gaussian Puff and Urban CFD Model for Two Large Cities," Atmospheric Environment, Feb. 1, 2005, pp. 1049-1068, vol. 39, No. 6.

* cited by examiner

Zone Z1 : doses ⩾ 500 Sv
Zone Z2 : 300 Sv ⩽ doses < 500 Sv
Zone Z3 : 100 Sv ⩽ doses < 300 Sv
Zone Z4 : 50 Sv ⩽ doses < 100 Sv
Zone Z5 : 20 Sv ⩽ doses < 50 Sv

METHOD FOR DETERMINING A TIME COURSE OF AN ACCIDENT OCCURRING IN A RISK-PRONE INSTALLATION

CROSS REFERENCE TO RELATED APPLICATIONS OR PRIORITY CLAIM

This application is a national phase of International Application No. PCT/EP2008/064276, entitled, "Process Of Determining A Temporal Evolution Of An Accident Which Occurs In An Installation With Risks", which was filed on Oct. 22, 2008, and which claims priority of French Patent Application No. 0758468, filed Oct. 22, 2007.

TECHNICAL FIELD AND PRIOR ART

The invention relates to a method for determining a time course of an accident which occurs in a risk-prone installation.

By risk-prone installation, should be meant a building or set of buildings in which processes are in progress and which have risks for humans and/or the environment. For example, this may be a nuclear plant or a chemical plant. By accident with a time course, is meant any accident, the source term of which changes over time. As this will be specified subsequently, the source term is a set of data which describe a source or sources which are identified as emitting one or more harmful substances in the installation, following the accident.

The consequences of an accident with a time course generally tend to worsen with the elapsed time. For example, this is the case of a fire which propagates in a building. When an accident occurs at one or several processes in progress in the installation, one or more sources emitting harmful substances appear in this installation. In the case of a nuclear installation, the expression «harmful substance» will be understood as radioactive radiation such as for example gamma radiation or neutron emission. In the case of a chemical installation, the expression «harmful substance» will be understood as for example an emission of harmful gas such as carbon monoxide.

Up to now, when an accident occurs in an installation, a crisis team is dedicated to managing the accident. This team establishes a set of hypotheses for determining the causes which have lead to the accident (identification of dysfunction(s)). From these hypotheses a set of quantities is inferred which may represent the circumstances of the accident and the time course of the latter. One or more intervention scenarios are then established for terminating the accident under minimum risk conditions for the persons which have to intervene. Presently, hours or even days of calculations are required for evaluating quantities which represent the consequences related to the dynamics of the accident. Such durations are detrimental to proper management of the accident. In the short term, decisions from the team managing the accident may lead to engaging actions which may endanger the persons designated for intervening and/or to degradation of the relevant installation. In the case of a nuclear installation, such calculations are performed with specialized software packages such as for example the TRIPOLI code (reference software of the Applicant) or the Monte-Carlo N-particle code better known under the name of MCNP code. These software packages use Monte-Carlo methods for determining the path of radiation or of a particle through obstacles with known properties (thicknesses, type of material). Computation times used by the software packages are of several hours.

With the method of the invention it is possible to avoid the drawbacks mentioned above.

DISCUSSION OF THE INVENTION

Indeed, the invention relates to a method for determining a time course of an accident which occurs inside a risk-prone installation in which at least one process takes place, characterized in that it comprises:

a step for determining a source term which identifies a source emitting a harmful substance from process data representative of at least one of the processes which take place in the installation and from geometrical data of the installation and which comprises representative data of the source, among which a harmful substance rate emitted by the source, a step for calculating in real time, the amounts of the present harmful substance in the installation, from said rate and geometrical data of the installation, and a diagnostic step during which are calculated time-dependent changes of the calculated amounts and at the end of which, after comparing time-dependent variations calculated with reference criteria, a datum on the feasibility or non-feasibility of an intervention in the installation is delivered.

By feasibility or non-feasibility datum, for intervention in the installation, should be meant a datum which may allow or not allow the triggering of an intervention in the installation.

The diagnostic step advantageously allows an estimation of the future development of risks incurred in the installation at a predefined and parameterizable time horizon. The calculation of the feasibility of an intervention in the installation takes into account geometrical data of the installation, pre-established mapping of the incurred risks, pre-calculated development of these risks and of the maximum admissible risk threshold for the interveners, this maximum admissible risk threshold being pre-defined and parameterizable.

According to an additional feature of the invention, if a datum of intervention non-feasibility is delivered, the method further comprises:

- a step for modifying all or part of the process data and/or all or part of the geometrical data of the installation in order to obtain totally or partly modified process data and/or geometrical data of the installation,
- a step for additionally determining an additional source term on the basis of partly or totally modified process data and/or geometrical data of the installation so as to calculate an additional rate of the harmful substance emitted by the source,
- an additional step for calculating in real time, additional amounts of the emitted harmful substance present in different points of the installation, from the additional rate and from geometrical data of the installation,
- an additional diagnostic step during which are calculated time-dependent variations of the additional amounts of the emitted harmful substance and at the end of which, after comparing additional calculated time-dependent variations with reference criteria, a datum of feasibility or non-feasibility of intervention in the installation is delivered.

The time for calculating the amount of emitted harmful substances which are present in the installation is advantageously very short. With the method of the invention it is thereby possible, within a very short period, to establish a mapping of the risks incurred in the installation in each point of the latter according to predefined and parameterizable geometrical accuracy.

The very short aforementioned calculation time is obtained by using a method different from that of the prior art. The calculations performed within the scope of the invention, use interpolation of results tabulated beforehand. In the case, for example, of a nuclear installation, the thereby formed tables correlate characteristics of the radioactive radiation source, geometrical data (such as wall thicknesses) or physical characteristics of materials with the resulting effect on the path of radioactive radiations. In this way, the calculation time is considerably reduced. Typically, the calculation of the path of a radioactive particle over a distance of a few tens of meters is thereby performed within a few seconds, a duration which should be compared with the few hours required with Monte-Carlo type software packages used according to the prior art.

The method of the invention in a particularly advantageous way, is applied to the case when the source term changes over time. The source term comprises the whole of the data relating to the source which emits the harmful substance, i.e.:

the position of the emitted source in the installation according to a reference system bound to the installation, the nature of the emitted harmful substance, the rate of the emitted harmful substance, the data which describe the immediate environment of the source emitting the harmful substance (presence of screens absorbing the harmful radiation for example).

By making available representative parameterizable models of the installation and of the processes in progress in this installation, the method of the invention allows optimum management of the intervention with view to stopping the accident in order to limit the impact on personnels and/or the environment.

By making available a parameterizable 2D geometrical model of the installation, the coupled risks which may occur at this installation may also be evaluated (risks of different natures which may occur simultaneously or consecutively). It is thus for example possible to easily determine the time courses of a criticality accident occurring in a nuclear installation subsequent to a damage capable of extensively modifying the geometry of the installation such as an earthquake or a fire.

The method of the invention may be applied in a crisis condition, i.e. when an actual accident occurs, or outside any crisis condition, for example when designing an installation or with a view to making modifications to an existing installation or for simulating a crisis condition. It is then sufficient to enter fictitious data.

The description which follows more particularly relates to the preferential embodiment of the invention according to which the accident is a criticality accident which occurs in a nuclear installation, the emitted harmful substance then being harmful radiation (gamma radiation and/or neutron emission), the rate of the emitted harmful substance being a number of fissions occurring per unit time by the source emitting the harmful radiation and the amounts of harmful substance being radiation doses.

SHORT DESCRIPTION OF THE FIGURES

Other features and advantages of the invention will become apparent upon reading the preferential embodiment made with reference to the appended figures, wherein.

In all the figures, the same marks designate the same elements.

DETAILED DESCRIPTION OF A PREFERENTIAL EMBODIMENT OF THE INVENTION

Figure 1:
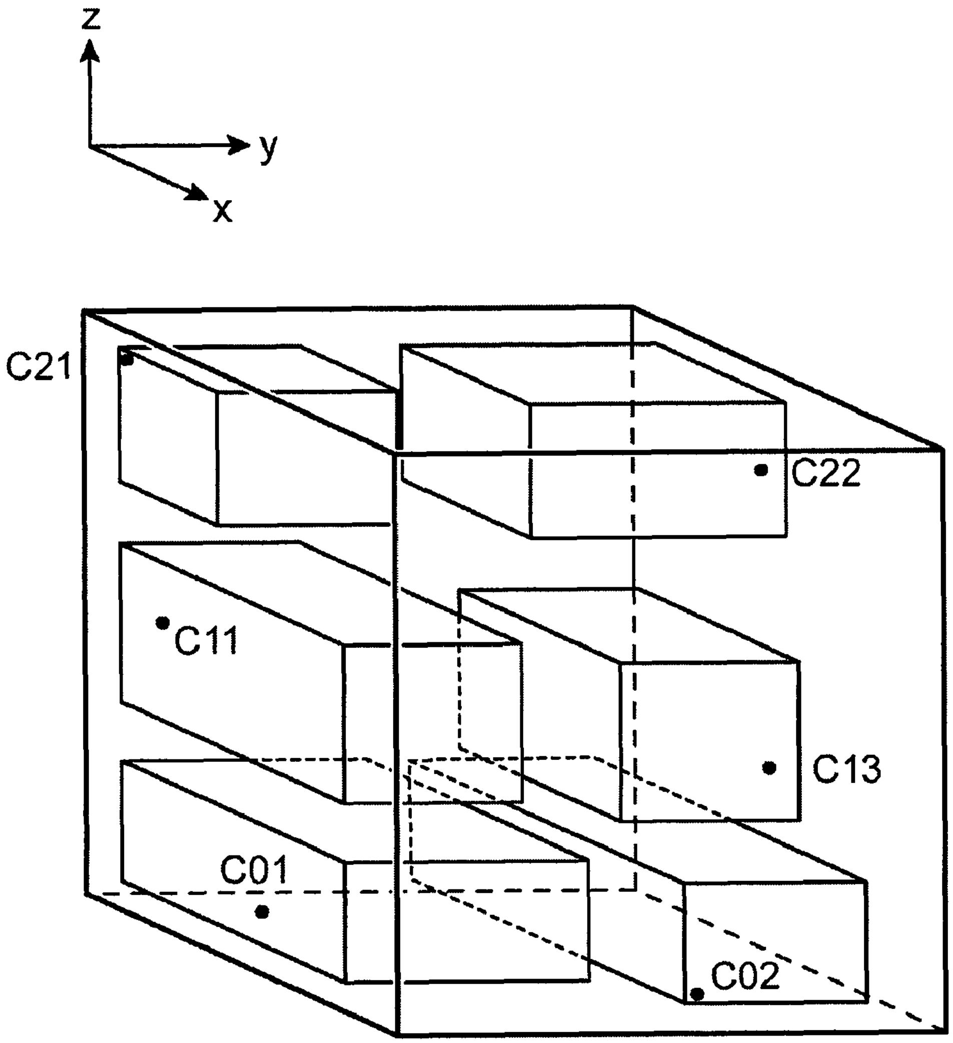
FIG. 1 illustrates an exemplary risk-prone installation in which an accident with a time course may occur.

FIG. 1 symbolically illustrates an exemplary risk-prone installation in which an accident with a time course may occur.

The installation for example, consists of a multi-story building, each story comprising several rooms. Different measurement sensors $C_{nm}$ are distributed in the different rooms of the installation. The sensors $C_{nm}$ are intended to conduct radiation measurements with which the position of the source(s) which emit(s) a harmful substance and the nature of this harmful substance may be identified. In the case of a nuclear installation, the sensors $C_{nm}$ for example are gamma sensors or neutron counters. The installation is located in a direct reference system (x, y, z) such that the z axis is the vertical axis along which is defined the height of the installation and the plane (x, y) is a horizontal plane for the installation.

Figure 2:
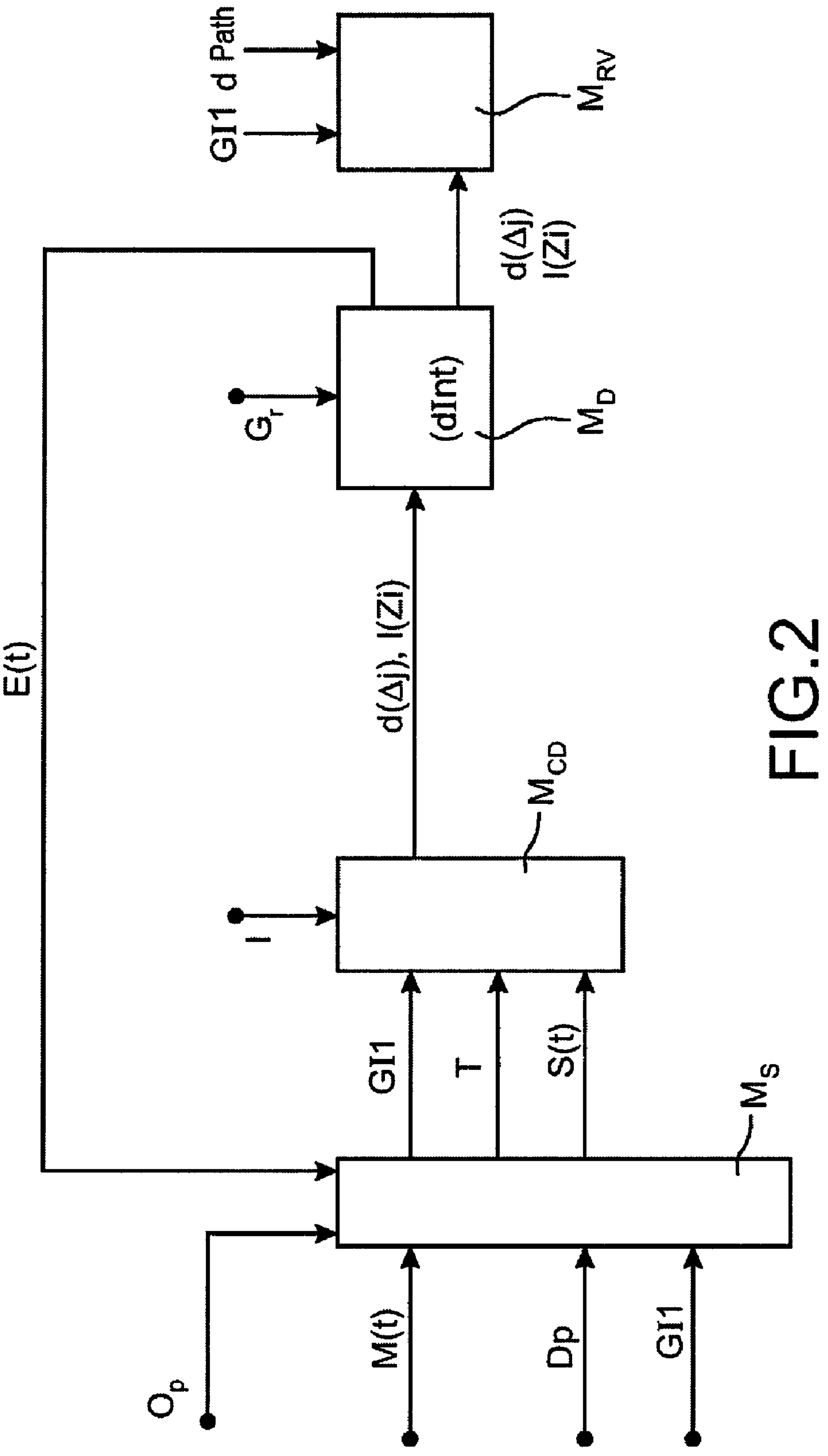
FIG. 2 illustrates a general block diagram of a device which applies the method of the invention in the case of an accident.

FIG. 2 illustrates the general block diagram of a device which applies the method of the invention in the case when a criticality accident occurs. The device essentially comprises a module $M_S$ for determining a source term, a module $M_{CD}$ for calculating radiation doses and a module $M_D$ for diagnosis. The modules $M_S$, $M_{CD}$ and $M_D$ preferentially are part of a same calculation system MP, for example a microprocessor or a computer.

The source term determination module $M_S$ identifies the origin of the criticality accident from data which comprise geometrical data GI1, measurements M(t), process data $D_p$ and, possibly, operator data $O_p$. The geometrical data GI1 are data recorded beforehand which describe all or part of the geometry of the installation, i.e.:

data which represent the bulk configuration of the building (the different rooms of the building, the envelope of the building) and data which represent the geometrical configuration of different screens present in the installation, in particular the screens associated with biological protections such as the walls of shielded cells or the equipment of processes in progress, forming an obstacle to the displacements of the harmful radiations.

The measurements M(t) are delivered by all or part of the different sensors present in the installation.

The data $D_p$ are descriptive data of all or part of the different processes which take place in the installation, i.e. the type of active medium, the flow rate, the concentration, etc.

The geometrical data GI1 and/or process data $D_p$ may be modified in order to be able to update the description of the events which occur in the installation. These events may be modifications of the actual installation (new constructions of biological screens, demolitions or further deteriorations consecutive to the accident in progress) or modifications relating to the processes in progress. As this will be specified subsequently, the modification of the geometrical data GI1 and/or of process data $D_p$ is made on the basis of operator data $O_p$ and/or time course data E(t).

The source term S(t) delivered by the module $M_S$ comprises the whole of the data relating to the source which emits the harmful radiation, i.e.:

the position of the radiation source, the nature of the relevant radiation (energy and radiation type), the number of fissions which occur versus time at the accident level, the geometrical data which describe the close environment of the source (number and position of possible screens), the physico-chemical data which characterize the medium in which the radiation source is found (either homogeneous or heterogeneous medium, if this is a homogeneous medium, nature of the homogenous medium (solution or powder), chemistry of the medium (concentration, type of chemical phase, etc.).

The position of the emitting source is obtained by triangulation, from at least one set of at least three sensors of the same nature. In this case, the nature of the radiation is obtained by the type of sensor which detects this same radiation (for example, neutron radiation sensors or gamma radiation sensors). The number of fissions which occur versus time at the level of the accident is inferred, in a way known per se from measurements conducted by these same sensors and taking into account the geometry and nature of the constitutive elements of the installation (walls, floors, screens, etc.). The geometry and nature of these constitutive elements stem from the geometrical 3D model.

In every case, the geometrical data which describe the geometry of the equipment in which takes place the process which contains the radiation source, the physico-chemical data which characterize the medium in which the source is found and the data which describe the environment of the latter are determined from the data $D_p$ and GI1, and, possibly, from operator data Op.

The operator data Op are data applied over time, they may be function of the time courses of the process. The operator data i.a. comprise all or part of the following data:

- geometrical data capable of defining the zones of the installation where it is desired that the calculations be performed,
- time data which define the chronology according to which it is desired to be informed on the time course of the accident,
- data which specify the different systems outside the installation, which may be interact with the accident,
- data relating to the environment of the accident (for example weather data),
- data capable of expressing hypotheses as to the causes of the accident (change in temperature, modifications of the chemical concentration of a process in progress, etc.).

To the source term determination step succeeds a step for dose calculation by the dose calculation module $M_{CD}$. The dose calculation step advantageously gives the possibility of calculating, within a very short time, from the data GI1, from the source term S(t) and from internal data I, the radiation doses present in the installation, whether the radiation is an emission of neutrons or gamma radiation. This step will be described in details subsequently, with reference to FIGS. 6-10. The dose calculation module $M_{CD}$ delivers dose or dose equivalent rate values $d(\Delta_j)$ calculated in different points $\Delta_j$ of the installation. Within the scope of the enhancement of the invention as mentioned above, the dose or equivalent dose rate $d(\Delta_j)$ values are distributed in dose intervals and form data $I(Z_i)$ distributed in different zones $Z_i$. The values $d(\Delta_j)$ either distributed or not in dose intervals, are input data for the diagnosis module $M_D$.

The diagnostic step applied by the module $M_D$ is a step for analyzing the time course of the criticality accident in the installation. During the diagnostic step, time course data E(t) are calculated, which are the time-dependent variations of the dose or equivalent dose rate $d(\Delta_j)$ values. Once they are calculated, the time course data E(t) are compared with reference criteria Cr in order to determine an intervention path taking into account the criteria C and the estimated path time required by an operator for covering this path, the time required by this same operator for performing the intended operation, and the time course of the activity of the source for estimating the dose integrated over the return time.

Figure 3:
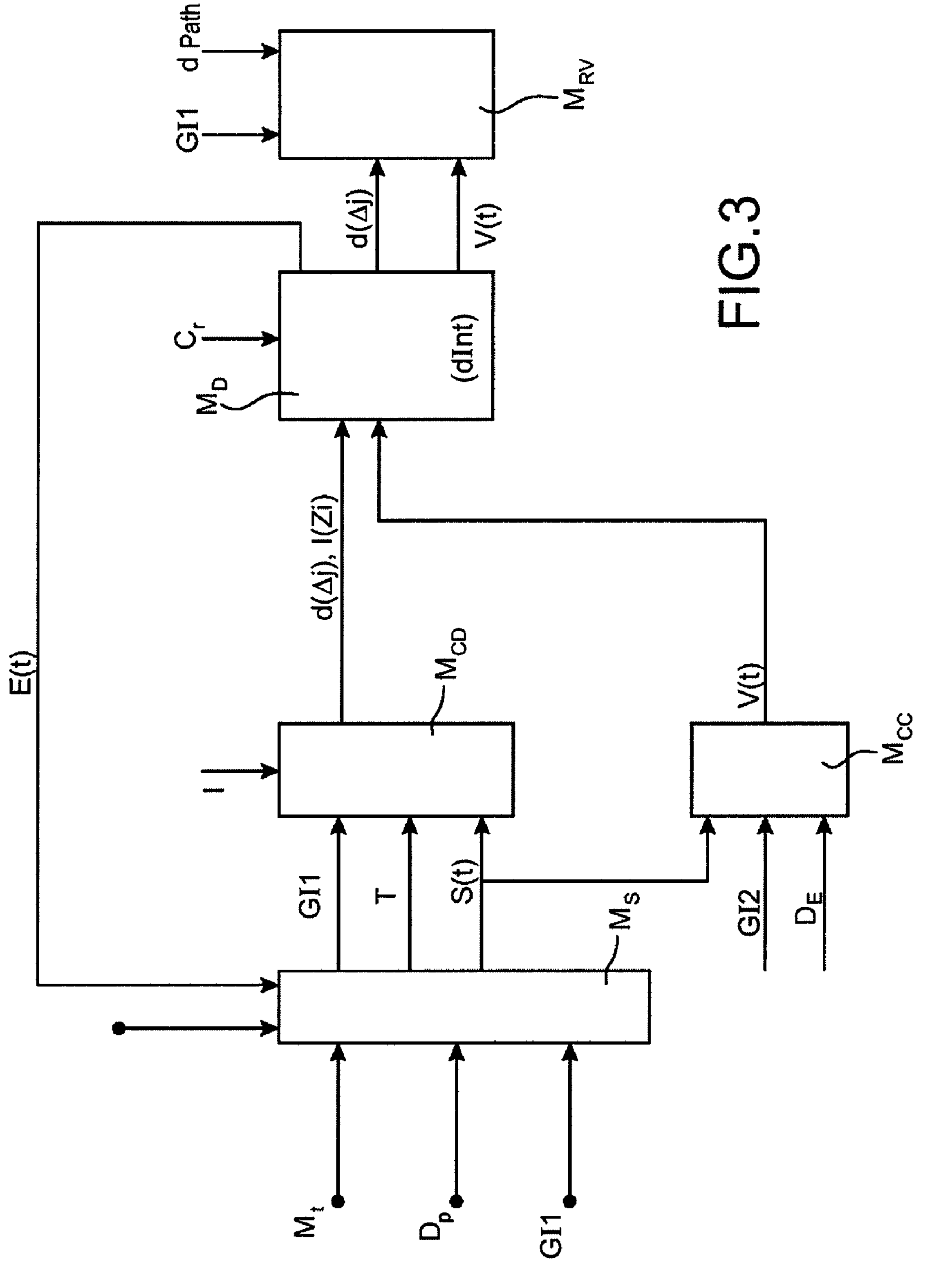
FIG. 3 illustrates an enhancement of the device of the invention illustrated in FIG. 2.

According to an enhancement of the invention, the method comprises, concurrently with the dose or equivalent dose rate calculation step, a step for calculating contamination. This enhancement is illustrated in FIG. 3. A contamination calculation module $M_{cc}$ determines from the source term S(t), from geometrical data GI2 and from environmental data $D_E$, the contamination conditions which may appear in humans and/or in the environment during/following an actual or simulated accident. It is thus possible to calculate the exposure of individuals to initial fissile material and to the fission products generated during the accident, i.e. for example, the external dose received by exposure to the plume and/or by exposure to deposits, the dose received on the thyroid, the effective received dose by inhalation or further the total received effective dose. These calculations may then take into account the wind speed, according to characteristics standardized by the national weather forecast or to the presence or not of rain during the accident. These calculations are carried out with a known algorithm such as e.g. the algorithm of the Gaussian burst model or the Doury model algorithm. The algorithm for calculating contamination states requires parameters and/or software packages which represent different known time courses and different known impacts of harmful products on humans and/or the environment. Depending on the input parameters S(t), GI2 and $D_E$, it is then possible to simulate the contamination which will result from the criticality accident in progress. It should be noted here that the geometrical data GI2 are not identical with the geometrical data GI1 mentioned earlier. Whereas the geometrical data GI1 relate to the geometrical description of the internal volume of the installation, the geometrical data GI2 relate to the interfaces of the installation with the outer environment, such as for example the height of chimneys, the distances between buildings, the filtering levels. The calculations take into account the exposure of personnels to the fission products generated during the kinetics of the accident.

Figure 4:
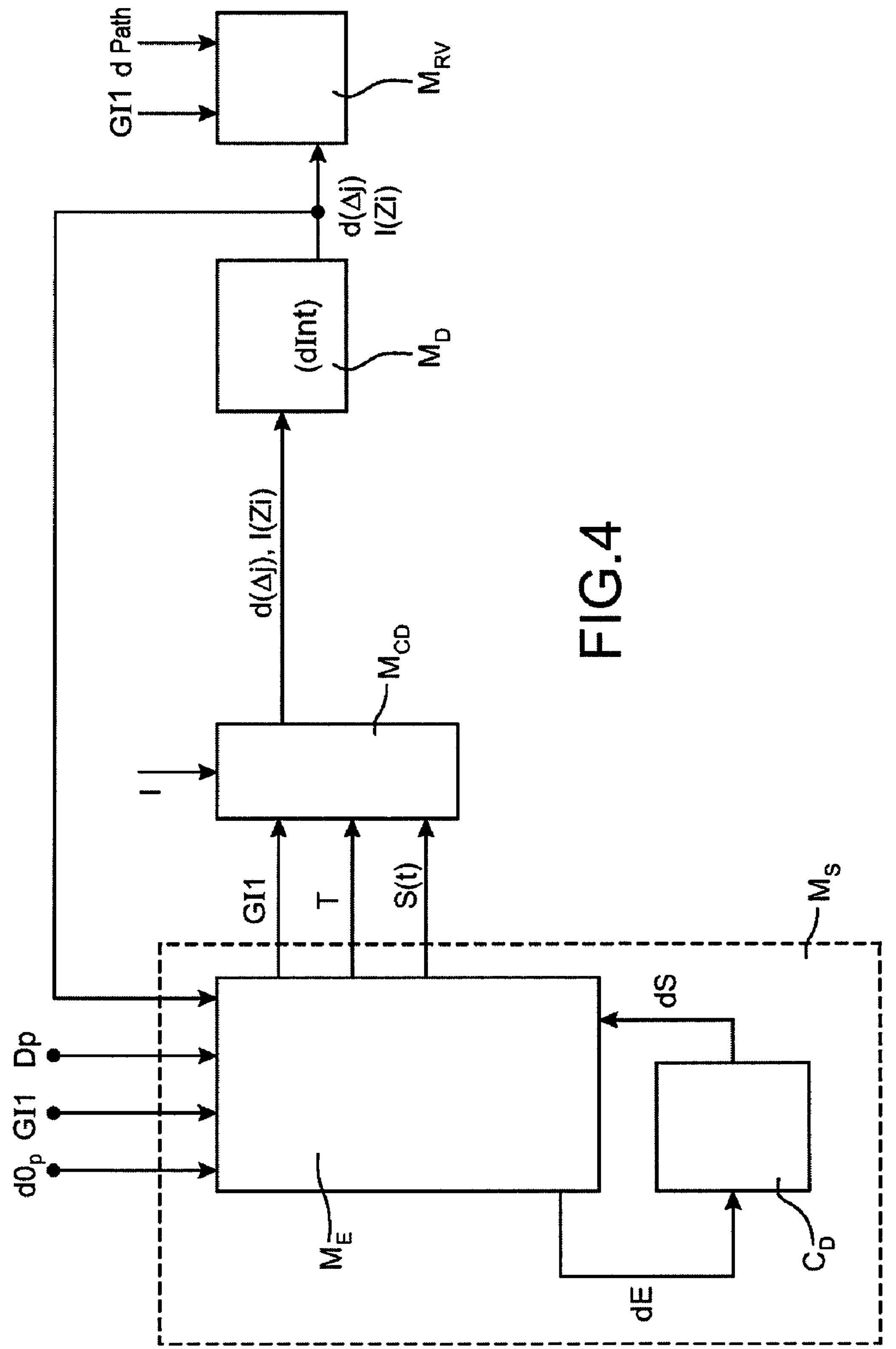
FIG. 4 illustrates a general device block diagram which applies the method of the invention in the case of an accident, the input data of which change over time.
Figure 5:
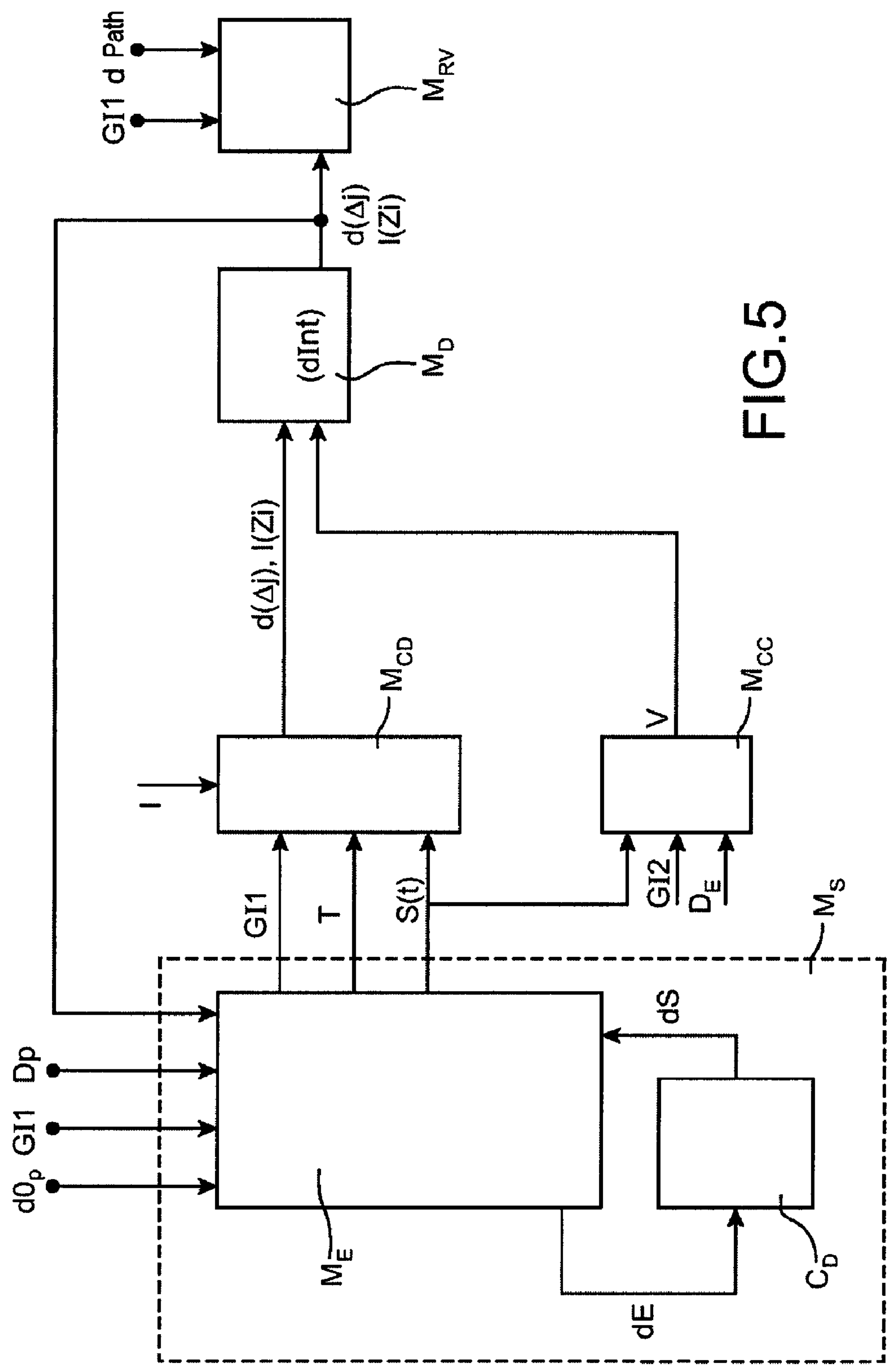
FIG. 5 illustrates an enhancement of the device of the invention illustrated in FIG. 4.

According to the enhancement of the invention, the impact values V(t) which stem from the contamination calculation step are input data for the diagnosis module $M_D$ and are accordingly involved in the analysis process of the time course of the criticality accident. The time course data may then depend not only on the time course of the doses or equivalent dose rates calculated for the irradiation, but also on the time course of the evaluated contaminations. FIGS. 4 and 5 will now be described.

FIGS. 4 and 5 correspond to the case when the accident is simulated. The source term determination module $M_S$ here consists of an expert module $M_E$ coupled with a calculation code module $C_D$.

The expert module $M_E$ essentially comprises an extrapolation module and data libraries. The data libraries comprise the whole of the physico-chemical data which characterize the different processes which may be applied in the installation and the calculation code module $C_D$ comprises the whole of the calculation codes or algorithms which may be associated with these different processes. The expert module $M_E$ receives as input the geometrical data GI1, the data $D_p$ and, possibly, operator data Op. The expert module $M_E$ delivers data dE required for modeling the dynamics of the accident, which are elaborated depending on the type of medium, by the calculation code module $C_D$. The calculation code implemented by the module $C_D$ is, for example, the Appollo calculation code, the Critex calculation code, the Powder calculation code, or any equivalent calculation code depending on the characteristics of the medium. The kinetic dynamic data dS delivered by the module $C_D$ are then used for elaborating the source term S(t) in time course situations.

Figure 6:
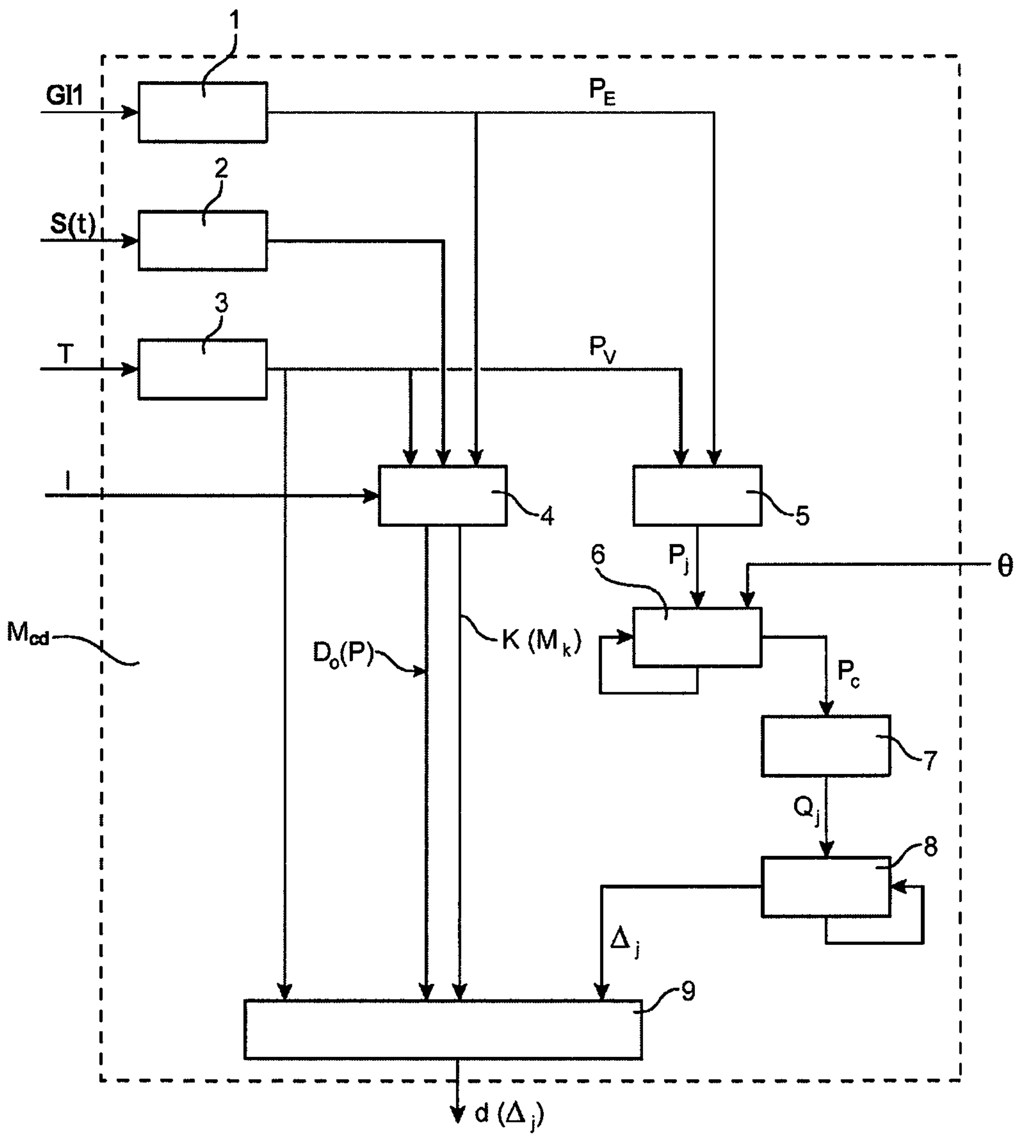
FIG. 6 illustrates a detailed view of a particular module of the device of the invention illustrated in FIGS. 2-5.

The step for calculating doses implemented by the module $M_{CD}$ will now be described. FIG. 6 illustrates a detailed description of different elementary modules which make up the module $M_{CD}$.

The step for calculating doses comprises a step for reading geometrical data GI1 (module 1) and a step for reading source data S(t) (module 2). The order in which the reading steps are carried out is immaterial, both of these steps may be carried out simultaneously.

As this was mentioned earlier, the geometrical data of the installation GI1 are i.a. representative of the bulk configuration of the building (the different rooms of the building), of the envelope of the building, of the equipment in which are implemented the methods and of the screens present in the building.

The source data S(t) read in step 2 are data relating to the source which emits the radiations. They consist of the number of fissions which occur, versus time, at the level of the accident, of geometrical data which describe the geometry of the equipment in which the accident occurred (point-like source or bulk source) and of medium data which characterize the medium in which the accident occurred (homogeneous medium, heterogeneous medium, liquid medium, powder, metal, etc.).

The reading steps mentioned above are followed by a step for evaluating the attenuation coefficients $K(M_k)$ (k=1, 2, . . . , n) of the different materials $M_k$ (k=1, 2, . . . , n) which make up the walls, floors, equipment of the processes and more generally all the screens of the installation and of theoretical data $D_O(P)$ which represent the radiation doses which would be present in the absence of any wall or screen, in different points P of the installation (module 3). The calculation step implemented by the module 3 is carried out from the data GI1, S(t) and from internal data I which comprise a mathematical model of the attenuation coefficient for each type of material. Preferentially, an attenuation coefficient appears as a polynomial equation. As a non-limiting example, an attenuation coefficient $K(M_k)$ of a material $M_k$ crossed by radiation is written as:

$$K(M_k)=aX+bY+cXY+dX^2+eY^2+fZ+gW$$

The coefficients a, b, c, d, e, f and g are known parameters with a set value which are characteristics of the material $M_k$ for which evaluation of the attenuation coefficient is sought. The quantities X, Y, Z are characteristic variables of the radiation source and the quantity W is a variable which represents the thickness of the crossed material $M_k$ (W will be specified later on). More specifically, the variable X depends on the type of source and on the type of medium (homogeneous medium, heterogeneous medium, liquid, powder, metal, etc.), the variable Y depends on the volume of the source and the variable Z depends on the time which has elapsed between the accident and the moment when the coefficient is determined. The coefficients a, b, c, d, e, f and g are data which belong to the set of data I mentioned earlier. The data X, Y, Z are data which belong to the set of data S and the datum W is calculated from the geometrical data G and from layout data T.

For a given source type and a given medium, the quantity $aX+bY+cXY+dX^2+eY^2+fZ$ is a constant term Ko. Thus, the quantity $K(M_k)$ is expressed as a function of the sole variable W, i.e.:

$$K(M_k)=gW+Ko$$

More generally, the internal data I in addition to the mathematical equations of the attenuation coefficients and the coefficients a, b, c, d, e, f, g, comprise the following data:

- the type of quantity in which it is desired that the doses should be calculated (dose in air (Gy units) or dose equivalent (Sv units)) and
- the conditions for calculating the attenuation coefficients (i.e. the coefficients—known per se—for correction of the distance between the source and the calculation points).

Figure 8:
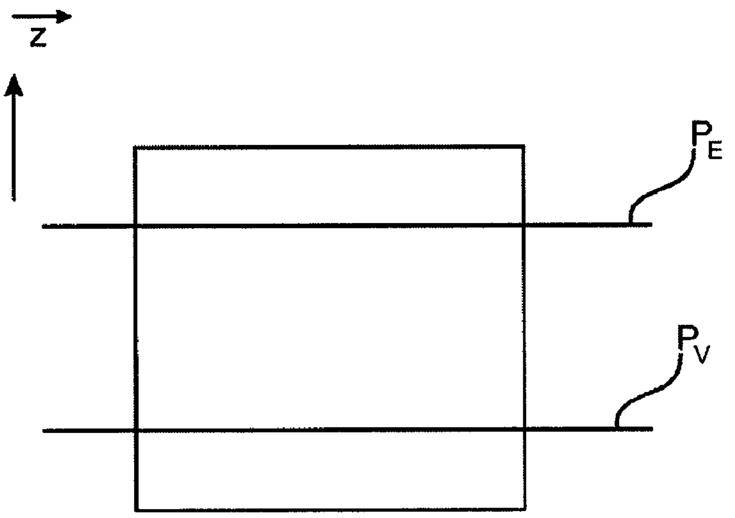
FIGS. 8-10 illustrate useful geometrical elements for applying the method of the invention.
Figure 9:
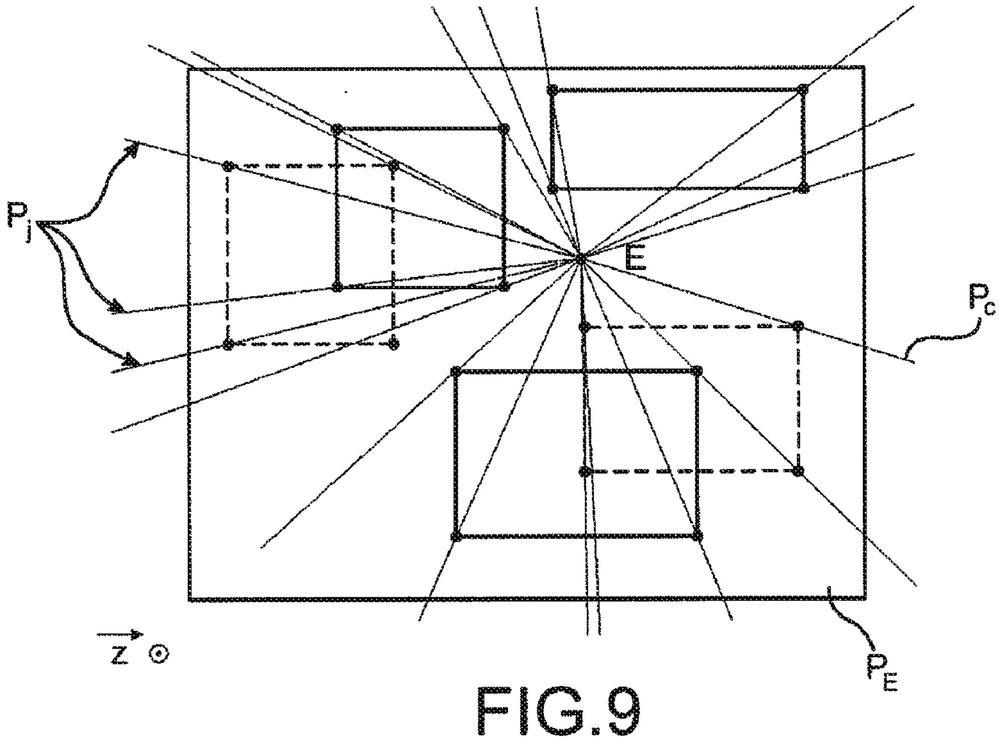

Concurrently with the calculation step carried out by the module 3, are carried out four elementary calculation steps carried out by the respective modules 4, 5, 6 and 7. The module 4 carries out a step for determining characteristic planes useful for the dose calculation. As a non-limiting example, a set of characteristic planes $P_j$ is illustrated in FIG. 9. FIG. 9 illustrates a sectional view of the installation along the horizontal plane $P_E$ which contains the point source E with which the source emitting harmful radiations is assimilated. The characteristic planes are constructed between the plane $P_E$ and a viewing plane $P_V$ parallel to the plane $P_E$. The viewing plane $P_V$ is the plane in which the isodose curves will be illustrated (cf. FIG. 8). Each characteristic plane $P_j$ is a vertical plane, i.e. a plane perpendicular to the planes $P_E$ and $P_V$, which contains the point E with which the source emitting harmful radiations is assimilated, and at least one junction edge between two vertical walls comprised between the planes $P_E$ and $P_V$. The set of all the planes which may be constructed according to the rule specified above, makes up the characteristic planes of the invention. Accordingly, all the edges of all the parts comprised between $P_E$ and $P_V$ and which are perpendicular to the planes $P_E$ and $P_V$ are affected. The set of characteristic planes is selected from the geometrical data G.

In step 5 (module 5), a scan is then carried out between the characteristic planes $P_j$ in order to determine different calculation planes $P_C$. The calculation planes $P_C$ are then obtained by rotation with an angular pitch θ, of the characteristic planes $P_j$ around an axis $Z_p$ perpendicular to the planes $P_E$ and $P_V$ and passing through the point source E. Each calculation plane $P_C$ is a plane in which a dose calculation is carried out, along a given direction, as this will be now described, as a non-limiting example in a particular calculation plane, with reference to FIG. 8.

Figure 10:
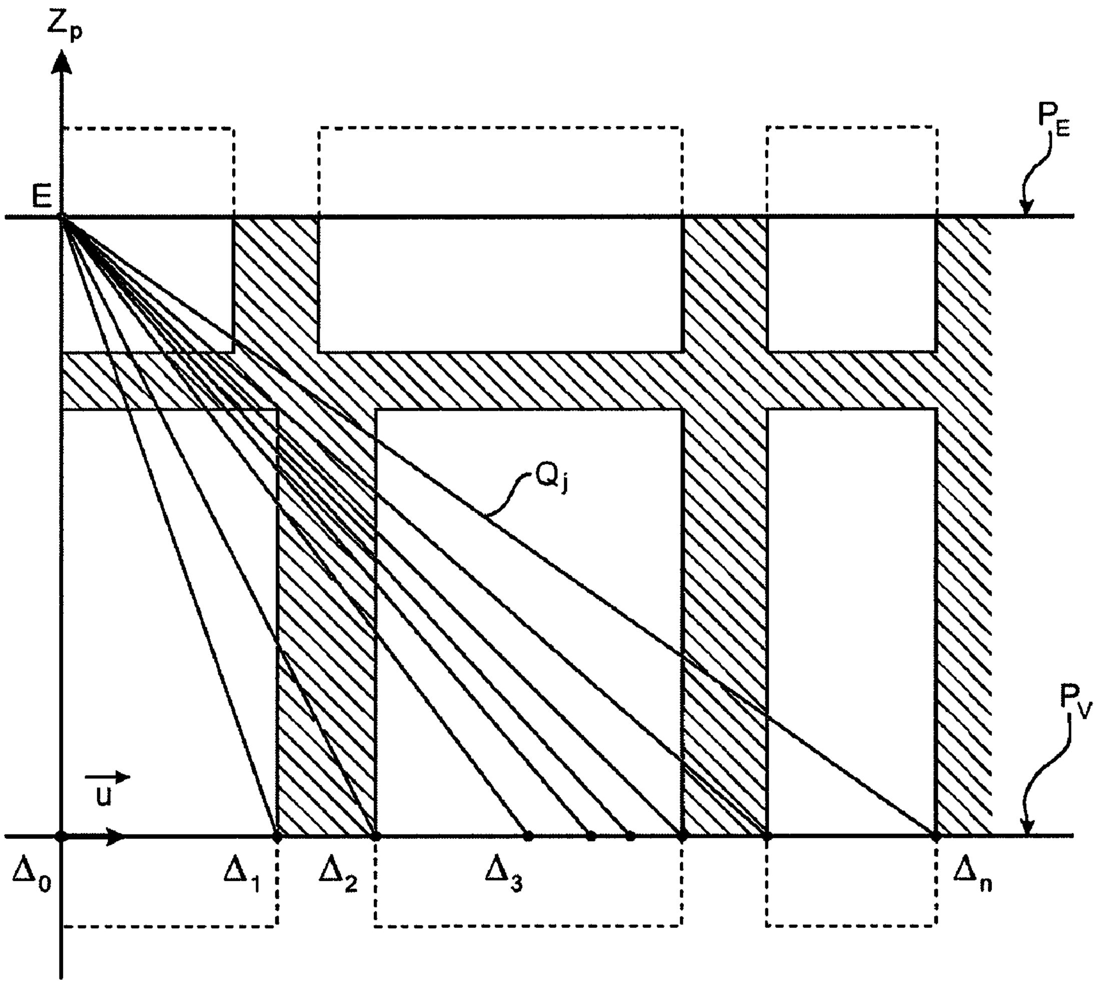

To step 5 for determining the calculation planes succeeds a step 6 (module 6) for determining characteristic lines $Q_j$ in each calculation plane. For a given calculation plane, a characteristic line $Q_j$ passes through the point source E and through at least one point located at the junction of two edges located in the calculation plane. All the lines which may be constructed according to the rule specified above, make up the set of characteristic lines $Q_j$ of the invention for the relevant calculation plane. By design, a calculation plane $P_c$ is divided into two half-planes symmetrical to each other with respect to the vertical axis $Z_p$. The set of characteristic lines relative to a calculation plane is therefore divided into two half-sets of characteristic lines. FIG. 10 illustrates as a non-limiting example, a half-set of characteristic lines $Q_j$ for a calculation plane $P_C$ of FIG. 9. The calculation half-plane cuts the viewing plane $P_V$ along a line D with a unit vector $\vec{u}$. A set of characteristic points $\Delta_j$ belonging to the line D is then determined (step 7 of the method of the invention). A characteristic point $\Delta_j$ is obtained by the intersection of a characteristic line $Q_j$ and of the line D. FIG. 8 illustrates as an example, a succession of characteristic points $\Delta_0, \Delta_1, \Delta_2, \ldots, \Delta_n$. The characteristic points $\Delta_j$ have a known geometrical position in the installation. The structure of the installation between the point source E and each of the points $\Delta_j$ is also known (cf. FIG. 10). Thus, from the data calculated earlier $D_0(P)$ and $K(M_k)$, from the known position of the points $\Delta_j$ relatively to the emitting source E and from the known structure of the installation between the source E and the points $\Delta_j$, the radiation dose $(\Delta_j)$ present in each point $\Delta_j$ may be calculated (step 8 of the method of the invention).

The calculation line D consists of open air zones and wall or screen zones. The calculation of the doses is only of real interest in the open air zones. The calculation of the doses $d(\Delta_j)$ is therefore only evaluated for the points $\Delta_j$ located in the open air zones.

The calculation of the dose in a point $\Delta_j$ is obtained by the following equation:

$$d(\Delta_j) = D_0(P) \times C_d \times \sum_k K(M_k)$$

$D_0(P)$ is the calculated dose, in the absence of walls and screens, in a predetermined arbitrary point P located, on the path of the radiation, at a distance $l_0$ from the point source E (in the case of a bulk source, the point E is the centre of the volume of the source), $C_d$ is a distance correction coefficient such that:

$$C_d = \frac{l_0^2}{l^2},$$

wherein $l_0$ is the distance mentioned earlier and l is the distance from the point source E to the point A, and $K(M_k)$ is the attenuation coefficient of the material $M_k$ as mentioned above.

The attenuation coefficient $K(M_k)$ will now be specified. As this was mentioned earlier, the attenuation coefficient of a material $M_k$ crossed by radiation is written as:

$$K(M_k) = g \times W + K_0$$

wherein the quantity W represents the distance covered by the radiation through the material $M_k$. Preferentially, the quantity W is defined as a function of the angle $\alpha$ formed by the direction of the radiation which crosses the wall, partition, or material screen $M_k$ with the normal to the plane of this wall, partition or screen:

For an angle $\alpha$ comprised between 0° and a predetermined limiting value $\alpha_{lim}$ ($0<\alpha_{lim}<\pi/2$), W is the actual thickness of the crossed material, and For an angle $\alpha$ comprised between the predetermined limiting value $\alpha_{lim}$ and $\pi/2$, W is the value $W_{lim}$ of the thickness of the wall or of the screen which corresponds to the angle $\alpha_{lim}$.

The amount $\alpha_{lim}$ is selected so as to not underestimate the dose $d(\Delta_j)$ for large angles. This amount $\alpha_{lim}$ varies with the type of radiation.

Figure 7:
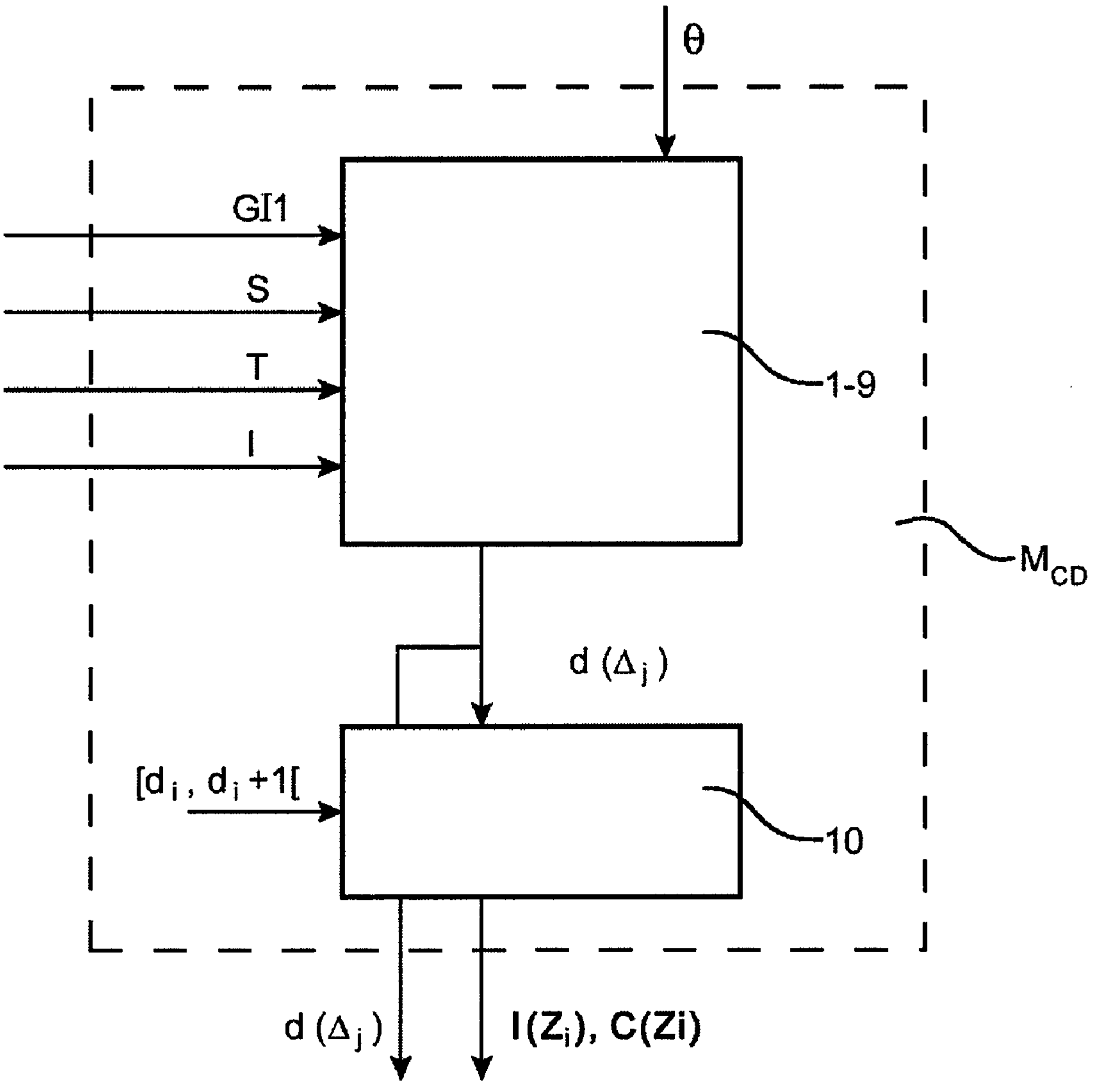
FIG. 7 illustrates an enhancement of the particular module illustrated in FIG. 6.

FIG. 7 illustrates an enhancement of the module illustrated in FIG. 6. The calculated doses are distributed here in predetermined dose intervals and isodose curves are elaborated. In addition to the modules 1-8 mentioned above, the modules $M_{cd}$ comprises a module 10 which distributes the calculated doses in predefined dose intervals [di, di+1[.

An example of such a distribution will be described, in which the doses $d(\Delta_j)$ are distributed in n dose intervals [di, di+1[ (i=1, 2, . . . , n).

The distribution of the calculated doses in the different dose intervals is carried out in this way:

if the doses $d(\Delta_j)$ and $d(\Delta_{j+1})$ calculated for two successive characteristic points $\Delta_j$ and $\Delta_{j+1}$ of a same open air zone belong to a same interval [di, di+1[, then a same zone $Z_i$ is allotted between these points;

otherwise, the dose $d((\Delta_j+\Delta_{j+1})/2)$ in the middle point $(\Delta_j+\Delta_{j+1})/2$ is calculated and one or more points $\Delta_k$ for which the dose $d(\Delta_k)$ is a dose interval limit are sought by dichotomy, a same appurtenance zone being allotted between two consecutive points belonging to the same dose interval.

The data d(Δj) distributed in the different zones Zi form the data I(Zi).

Figure 11:
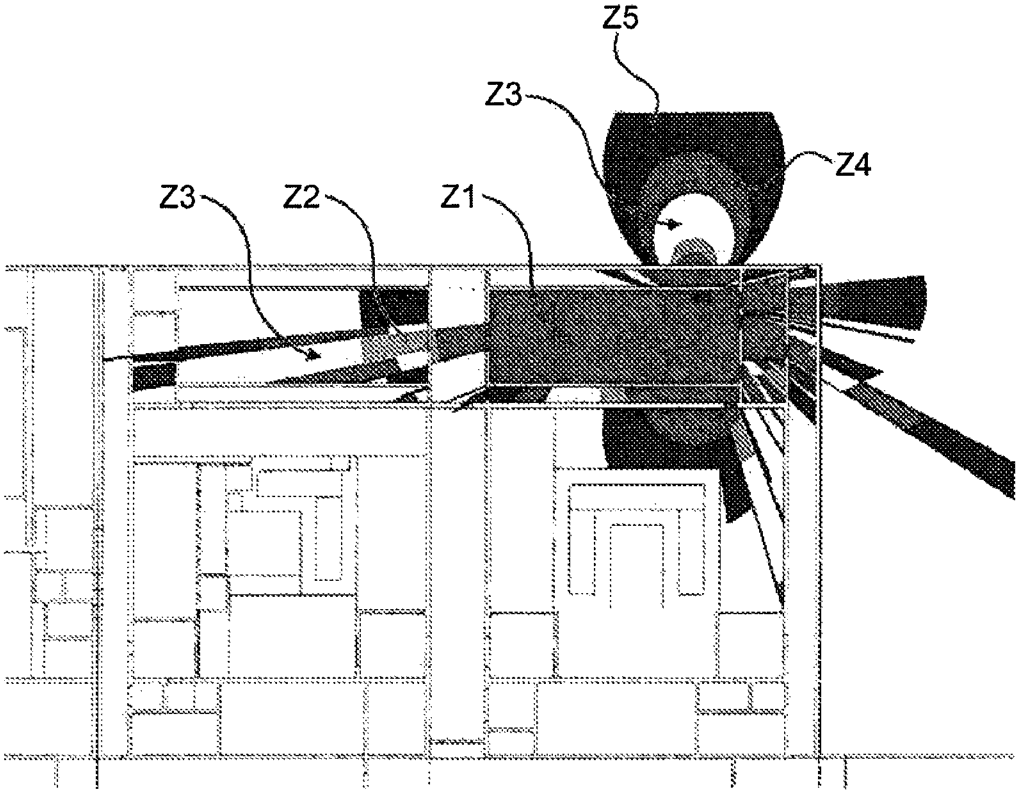
FIG. 11 illustrates an example of isodose curves obtained within the scope of the method of the invention.

It is then possible to obtain, for a same calculation line D, a curve of isodoses $C(Z_i)$ from the data I $(Z_i)$ (step 9 of the method). Obtained for the set of calculation lines, i.e. for the set of calculation planes, the isodose curves $C(Z_i)$ form a surface of isodoses in the whole of the viewing plane $P_V$. As a non-limiting example, FIG. 11 illustrates a distribution of the doses calculated in the five zones Z1-Z5.

In the particular case when the viewing plane is the horizontal plane $P_E$ which contains the point source E, all the walls and screens are crossed perpendicularly to their surface ($\alpha$=0). The values of the attenuation coefficients are then constant values k. The calculations are thereby simplified very advantageously.

If the doses $d(\Delta_j)$ and $d(\Delta_{j+1})$ do not belong to the same interval [di, di+1], the distance l which separates the point source E from a point $\Delta_j$ where the radiation dose $d(\Delta_j)$ corresponds to an interval limit simply expressed by the equation:

$$l = l_0 \times \sqrt{\frac{D_0(P)}{d_k} \times \sum_k K(M_k)}$$

The method of the invention has many advantages:

calculating in real time the impact of a criticality accident, diagnosing and predicting the time course of the accident, preventing unacceptable consequences which may occur at the level of intervention teams, by simulating solutions which may apply modifications of the actual installation or modifications of the processes applied in the latter, so as to check the feasibility and efficiency of these modifications, validating the feasibility of the decisions made for an intervention, preparing in virtual reality the conditions under which it was decided that an intervention will be carried out, training future interveners, simulating crisis practices.

Before any intervention, with the method of the invention by means of a simulation module, it is possible to validate the technical feasibility of the intervention. For example, it is then possible to estimate the neutron and/or gamma dosimetry for selecting the less dosing intervention path. By preparing the intervention in virtual reality for example, the intervener(s) may be prepared for spraying with extinguishing powders, with the purpose of stopping the accident.

During the intervention, the method of the invention for example allows the dosimetric backgrounds in which the intervener(s) are found, to be tracked in real time. It is then possible to take into account any time-dependent change to which the installation has been subject (for example the falling of a wall or protective screen) and to launch new dose calculations taking this change into account.

Moreover, with the method of the invention it is advantageously possible to rapidly establish safety files which may lead to new dimensionings of the installation.

The invention claimed is:

1. A method for determining with a computer a time course of an accident which occurs inside a risk-prone installation in which at least one process takes place, characterized in that it comprises:

a step for determining a source term which identifies a source emitting a substance, the source term comprising a rate datum, at the source, of the substance emitted by the source, the source term being determined from process data representative of a process which take place in the installation, from geometrical data of the installation and from measurement data which identify a position of the source and a nature of the emitted substance, said step of determining being carried out by means of a determination module of said computer, a step for calculating, in real time, amounts of the substance present in the installation, from said rate and said geometrical data of the installation, said step for calculating being carried out by means of a calculation module of said computer, and a diagnostic step carried out by means of a diagnosis module of said computer, wherein:

a) time course data of the delivered amounts of the substance are calculated at the end of the calculation step, the time course data comprising, a datum from an estimation of an integrated amount of the substance which takes into account an estimated travel time required by an operator for covering an intervention path, a time for performing an intervention and a return time, and b) the calculated time course date are compared with reference criteria for delivering a datum of feasibility or non-feasibility of intervention in the installation.

2. The method according to claim 1 wherein the source term is identified and the rate datum is produced from measurements from sensors present in the installation and from process data.

3. The method according to claim 1, wherein, if a datum of non-feasibility of the intervention is delivered, it further comprises:

a step for modifying all or part of the process data and/or all or part of the geometrical data of the installation in order to obtain totally or partly modified process data and/or geometrical data of the installation, an additional step for determining an additional source term on the basis of partly or totally modified process data and/or geometrical data of the installation so as to calculate an additional rate of the substance emitted by the source, an additional step for calculating in real time additional amounts of the emitted substance present in different points of the installation, from the additional rate and from geometrical data of the installation, an additional diagnostic step during which are calculated time-dependent variations of the additional amounts of the emitted substance and, at the end of said additional diagnostic step, after comparison of the additional calculated time-dependent variations with reference criteria, a datum of feasibility or non-feasibility of intervention in the installation is delivered.

4. The method according to claim 1, wherein the geometrical data of the installation are modified depending on events which modify a geometry of the installation.

5. The method according to claim 1, wherein the accident is a criticality accident which occurs in a nuclear installation, the emitted substance being radiation, the rate being a number of fissions produced per unit time by the source emitting the radiation and the amounts of substance being radiation doses.

6. The method according to claim 5 and which further comprises a contamination calculation step which calculates impact values of the criticality accident on humans and/or an environment from the source term, additional geometrical data and environmental data, the impact values being involved in the diagnostic step so that, during the diagnostic step, time-dependent variations of the impact values are calculated and the datum of intervention feasibility is proposed after analyzing the time-dependent dose variations and time-dependent variations of the impact values.

7. The method according to claim 5, wherein the step for calculating, in real time, doses of the radiation present in the installation comprises the following steps:

determining attenuation coefficients of the materials which make up the vertical walls and floors of the installation and any screen which is placed on a trajectory of the radiation, determining, from the geometrical data of the installation, between a source plane perpendicular to the vertical walls of the installation and which contains a point source representative of the source at an origin of the accident and a viewing plane parallel to the source plane, a set of characteristic planes perpendicular to the source plane and each containing the point source and at least one junction edge between two vertical walls of the installation;

angularly scanning the characteristic planes around an axis perpendicular to the source plane and passing through the point source in order to define at least one calculation plane;

determining for the calculation plane, a set of characteristic lines, each characteristic line passing through the point source and through at least one point located at the junction of two junction edges;

on a calculation line located at the intersection of the viewing plane and of the calculation plane, determining positions of intersection points between the calculation line and the characteristic lines;

from the intersection points present on the calculation line, selecting intersection points $\Delta_j$ located in the open air zones of the installation;

calculating the radiation dose $d(\Delta_j)$ present in each point $\Delta_j$, from the number of fissions versus time, from a distance which separates the point source from said each point $\Delta_j$ and from attenuation coefficients of the constitutive materials of the vertical walls and/or the floors, and/or of any screen which separates the point source from the point $\Delta_j$.

8. The method according to claim 7 which further comprises:

if two calculated doses $d(\Delta_j)$ and $d(\Delta_{j+1})$ for two consecutive selected intersection points $\Delta_j$ and $\Delta_{j+1}$ belong to a same predetermined dose interval, a same appurtenance zone $(Z_i)$ is allotted to both calculated doses, and otherwise, a radiation dose $d((\Delta_j+\Delta_{j+1})/2)$ is calculated in a point located in a middle between the two consecutive points $\Delta_j$ and $\Delta_{j+1}$ and one or more points $\Delta_k$ for which a dose $d(\Delta_k)$ is a dose interval limit are sought by dichotomy, and a same appurtenance zone is allotted between two consecutive points belonging to a same predetermined same dose interval, and an isodose curve is formed along the calculation line, depending on the appurtenance zones allotted to the calculated radiation doses.

9. The method according to claim 8, wherein the angular scan is carried out over 360 degrees so that a set of isodose curves established along a set of calculation lines are grouped together in order to form a representation of the isodoses in the whole of the viewing plane.

10. The method according to claim 7, wherein the radiation dose present at the selected intersection point is given by the equation:

$$d(\Delta_j) = D_0(P) \times C_d \times \sum_k K(M_k), \text{ wherein}$$

$D_0(P)$ is a dose calculated in the absence of vertical walls, floors and screens, in a predetermined arbitrary point located on the path of the radiation which propagates between the point source and the point $\Delta_j$, at a distance $l_0$ from the point source E, $C_d$ is a distance correction coefficient such that:

$$C_d = \frac{l_0^2}{l^2},$$

wherein l is a distance between the point source to the point $\Delta_j$, and $K(M_k)$ is a calculated attenuation coefficient of a material $M_k$ crossed by radiation which propagates between the point source E and the point $\Delta_j$.

11. The method according to claim 10, wherein the attenuation coefficient $K(M_k)$ is given by the formula:

$$K(M_k)=g\times W+K_0, \text{ wherein}$$

W is a quantity which represents the crossed thickness of the material $M_k$, g is a known characteristic coefficient of the material $M_k$, $K_0$ is a known term which depends on the radiation source and on the material $M_k$.

12. The method according to claim 11, wherein the quantity W is defined as a function of the angle $\alpha$ formed by a direction of the radiation with a normal to the vertical wall of material $M_k$ so that:

for an angle $\alpha$ comprised between 0° and a predetermined limiting value $\alpha_{lim}(0<\alpha_{lim}\pi/2)$, W is the actual thickness of the crossed material, and for an angle $\alpha$ comprised between the predetermined limiting value $\alpha_{lim}$ and $\pi/2$, W is the material thickness crossed by radiation, the direction of which forms the angle $\alpha_{lim}$, with the normal to the vertical wall.

13. The method according to claim 5, wherein the radiation is gamma radiation or neutron emission.

* * * * *

UNITED STATES PATENT AND TRADEMARK OFFICE

CERTIFICATE OF CORRECTION

PATENT NO. : 8,407,030 B2
APPLICATION NO. : 12/739142
DATED : March 26, 2013
INVENTOR(S) : Masse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
First Day of September, 2015

Michelle K. Lee
*Director of the United States Patent and Trademark Office*